(12) United States Patent
Lin et al.

(10) Patent No.: US 7,841,727 B2
(45) Date of Patent: Nov. 30, 2010

(54) PROJECTION OPTICAL SYSTEM HAVING A LIGHT BLOCKER

(75) Inventors: Ming-Te Lin, Taipei Hsien (TW); Wen-Pin Yeh, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 478 days.

(21) Appl. No.: 12/040,826

(22) Filed: Feb. 29, 2008

(65) Prior Publication Data
US 2009/0033887 A1 Feb. 5, 2009

(30) Foreign Application Priority Data
Jul. 30, 2007 (CN) .................. 2007 1 0201218

(51) Int. Cl.
*G03B 21/14* (2006.01)
*G03B 21/28* (2006.01)
*G03B 21/22* (2006.01)
*G03B 9/02* (2006.01)
*G02B 9/08* (2006.01)
*H04N 5/74* (2006.01)

(52) U.S. Cl. .................. 353/97; 353/98; 353/75; 359/739; 359/904; 396/505; 348/771

(58) Field of Classification Search .............. 353/97, 353/98, 75; 359/739, 904; 396/505; 348/771
See application file for complete search history.

(56) References Cited

U.S. PATENT DOCUMENTS

| | | | | |
|---|---|---|---|---|
| 5,583,688 | A * | 12/1996 | Hornbeck | 359/291 |
| 6,806,992 | B2 * | 10/2004 | Soneda et al. | 359/291 |
| 6,923,544 | B2 | 8/2005 | Ito | |
| 7,388,631 | B2 * | 6/2008 | Freeman | 349/110 |
| 2006/0023174 | A1 * | 2/2006 | Kang et al. | 353/97 |
| 2006/0044527 | A1 * | 3/2006 | Watanabe et al. | 353/97 |
| 2006/0139713 | A1 * | 6/2006 | Yee et al. | 359/201 |

FOREIGN PATENT DOCUMENTS
CN 1607456 A 4/2005

\* cited by examiner

*Primary Examiner*—Georgia Y Epps
*Assistant Examiner*—Magda Cruz
(74) *Attorney, Agent, or Firm*—Andrew C. Cheng

(57) ABSTRACT

A projection optical system includes a digital micro-mirror device and a light blocker disposed along the light path of the digital micro-mirror device. The digital micro-mirror device includes a base having a plurality of outer pads, a micro-mirror array disposed on the base, and a plurality of bonding wires. The bonding wires are electrically connecting the outer pads with the corresponding micro-mirror array. The light blocker is configured for blocking the light incident to the bonding wires and the light reflected by the bonding wires.

9 Claims, 4 Drawing Sheets

PROJECTION OPTICAL SYSTEM HAVING A LIGHT BLOCKER

RELATED FIELD

The present invention relates generally to a projection optical system, and more specifically to a projection optical system having a light blocker.

BACKGROUND

Generally, digital light processing (DLP) projectors include a digital micro-mirror device (DMD). The DMD is configured for superimposing spatial information on an incident light and emitting the light. Referring to FIG. 4, the DMD includes a base 10, a number of outer pads 101 are disposed on the base 10, a micro-mirror array 111 (only a number of micro-mirrors are shown), and a number of bonding wires 121. The micro-mirror array 111 is disposed on the base 10 and is electrically connected to the outer pads 10 via the bonding wires 121. The bonding wires 121 are configured for transferring control signal to the DMD to control a rotation of each micro-mirror of the micro-mirror array 111.

In manufacture of the DMD, the bonding wires 121 are bare at the base 10. When an incident light strikes the DMD, the bare surface of the bonding wires 121 on the base 10 may reflect the incident light to produce stray light and may in turn be projected onto a screen along with the desired image.

It is desired to provide a projection optical system which can overcome the above-described deficiency.

SUMMARY

According to the present invention, a projection optical system includes a digital micro-mirror device and a light blocker disposed along the light path of the digital micro-mirror device. The digital micro-mirror device includes a base having a plurality of outer pads, a micro-mirror array disposed on the base, and a plurality of bonding wires. The bonding wires are electrically connecting the outer pads with the corresponding micro-mirror array. The light blocker is configured for blocking light incident to the bonding wires and the light reflected by the bonding wires.

Other novel features and advantages will become more apparent from the following detailed description when taken in conjunction with the accompanying drawings.

BRIEF DESCRIPTION OF THE DRAWINGS

The present invention is described in detail hereinafter, by way of example and description of preferred and exemplary embodiments thereof and with reference to the accompanying drawings, in which.

DETAILED DESCRIPTION OF THE PREFERRED EMBODIMENTS

A detailed explanation of a projection optical system according to an embodiment of the present invention will now be made with reference to the drawings attached hereto.

Figure 1:
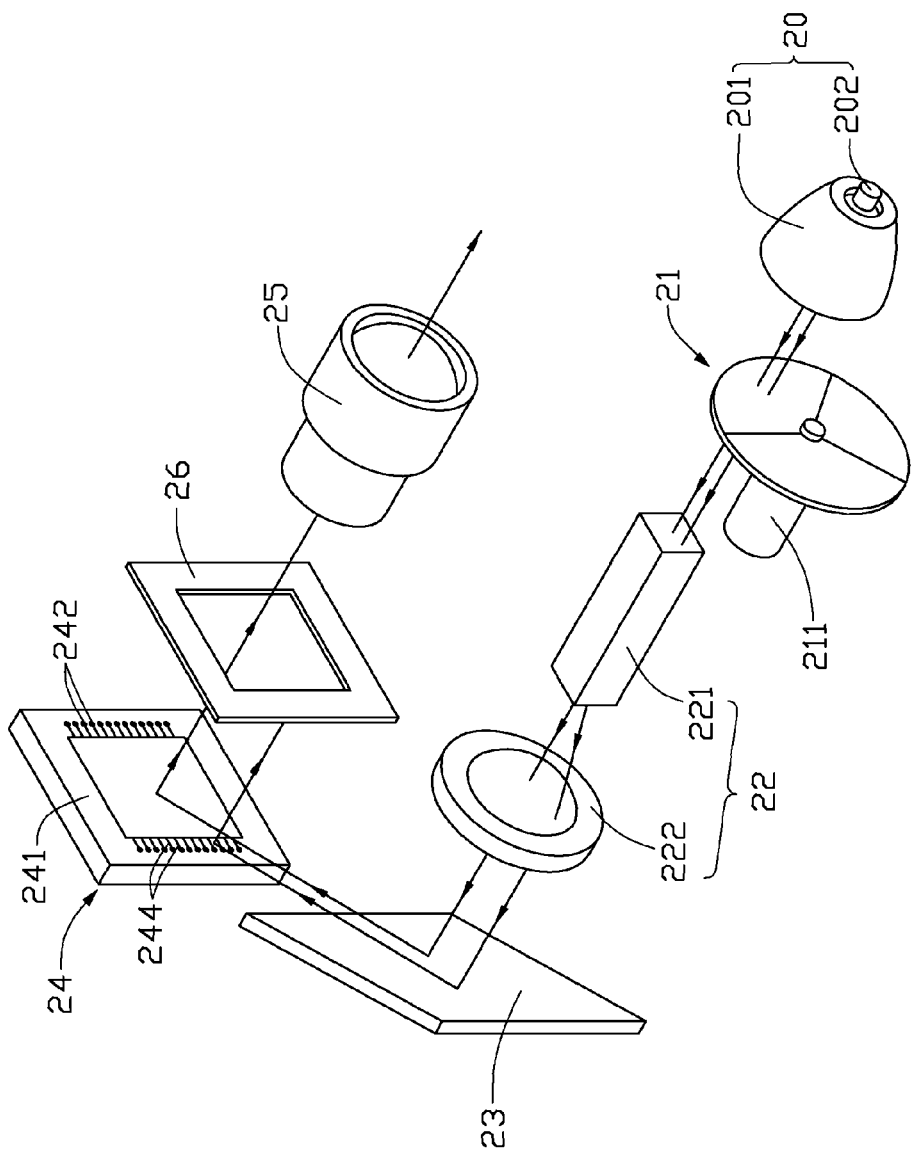
FIG. 1 illustrates a configuration of a projection optical system in accordance with a first embodiment of the present invention.
Figure 2:
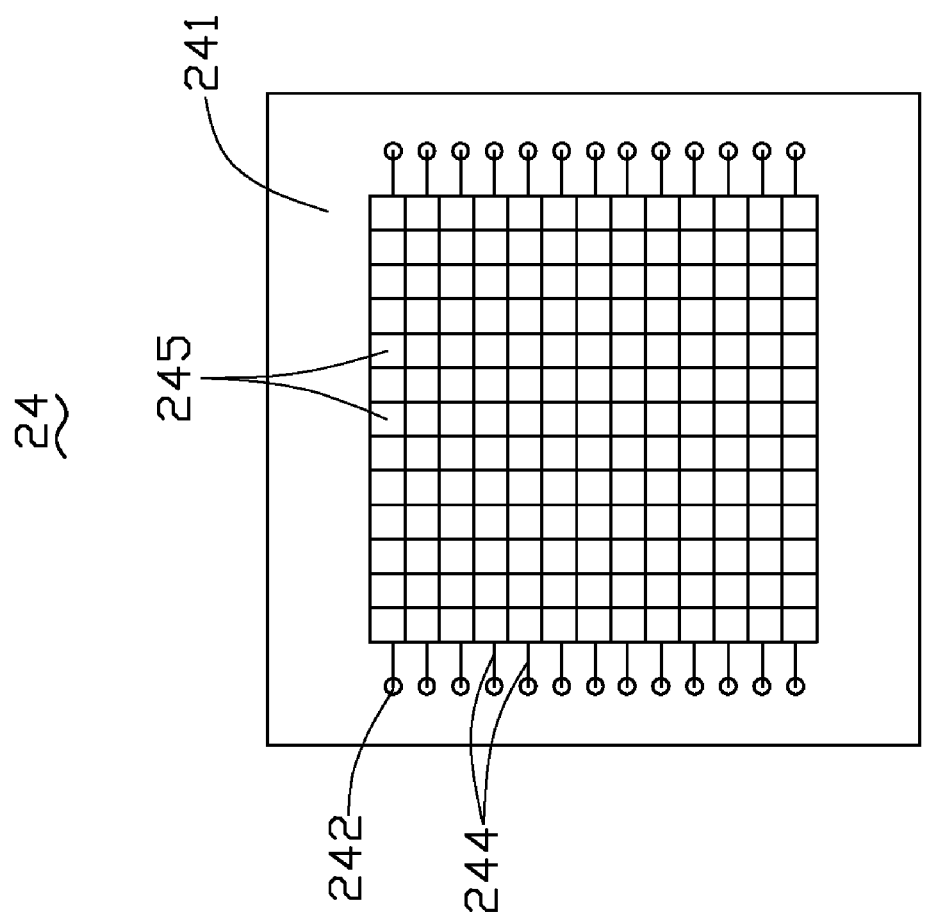
FIG. 2 is a schematic view of a digital micro-mirror device of the projection optical system of FIG. 1.

Referring to FIG. 1 and FIG. 2, a projection optical system 100 according to a first embodiment of the present invention is shown. The projection optical system 100 includes a light source assembly 20, a color wheel 21, a condensing lens 22, a reflector 23, a digital micro-mirror device 24, a projecting lens 25, and a light blocker 26.

The light source assembly 20 is configured for providing parallel light beams for the projection optical system 100 and includes a lamp 202 (only a portion of the lamp is shown) and an ellipsoidal reflector 201. The lamp 202 is disposed in a space surrounded by the ellipsoidal reflector 201. The lamp 202 can be a halogen lamp, a metal halogen lamp, a light emitting diode (LED), and the like. In the present embodiment, the lamp 202 is a halogen lamp that emits a white light. A reflective film (not shown) is employed on an inner surface of the ellipsoidal reflector 201 to reflect the light beams output from the lamp 202.

The color wheel 21 is configured for splitting the emergent light from the light source assembly 20 into time-sequenced red, green, and blue light beams. The color wheel 21 includes red, green, and blue color filters, and the center of the color wheel 21 is connected to a motor 211 such that the color wheel 21 can be rotated.

The condensing lens 22 is disposed in the emergent light of the color wheel 21 and includes a integrator 221 and a condenser 222. The integrator 221 is configured for processing the light beam emitted from the color wheel 21 such that light beams exiting from the integrator 22 have a uniform spatial distribution. The condenser 222 is configured for avoiding dissipation of the light.

The reflector 23 can be a mirror for changing light path of light output the condenser 27 to reduce the size of the projection optical system 100.

The DMD 24 includes a base 241, a number of outer pads 242 are disposed on the base 241, a micro-mirror array (only a number of micro-mirrors 245 are shown), and a number of bonding wires 244. The micro-mirror array is disposed on the base 241 and is electrically connected to the outer pads 242 via the bonding wires 244. The bonding wires 244 are configured for transferring control signal to the DMD 24 to control a rotation of each micro-mirror 245 of the micro-mirror array.

The projecting lens 25 is configured for receiving the light output of the DMD 24, and magnifying the light output and projecting an image on a screen (not shown).

The light blocker 26 is an integrated frame-shaped plate in an embodiment shown in FIG. 1. The light blocker 26 is disposed along the light path of the light output from the DMD 24, such as between the DMD 24 and the projecting lens 25 or the emergent light of the projecting lens 25. In the present embodiment, the light blocker 26 is disposed between the DMD 24 and the projecting lens 25. The light blocker 26 is configured for blocking light incident to the bonding wires 244 or reflected by the bonding wires 244 before the light is projected. The light blocker 26 is made of a opaque resin. In particular, a surface of the light blocker 26 is coated black to absorb the light reflected by the bonding wires 244.

It can be understood that the light blocker 26 can also be disposed along the light path of the light input into the DMD 24 to block the light incident on the bonding wires 244.

Figure 3:
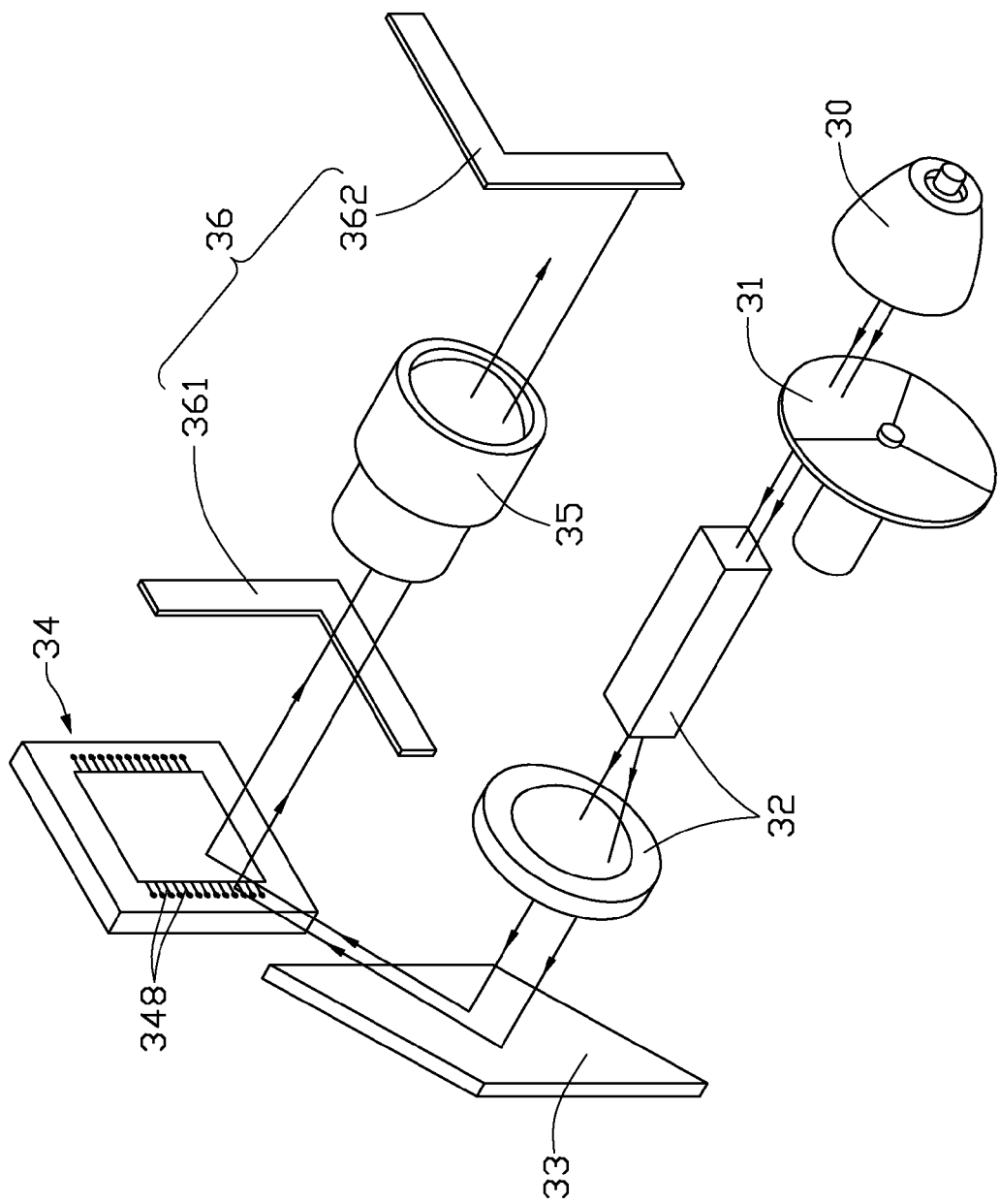
FIG. 3 is illustrates a configuration of a projection optical system in accordance with a second embodiment of the present invention.
Figure 4:
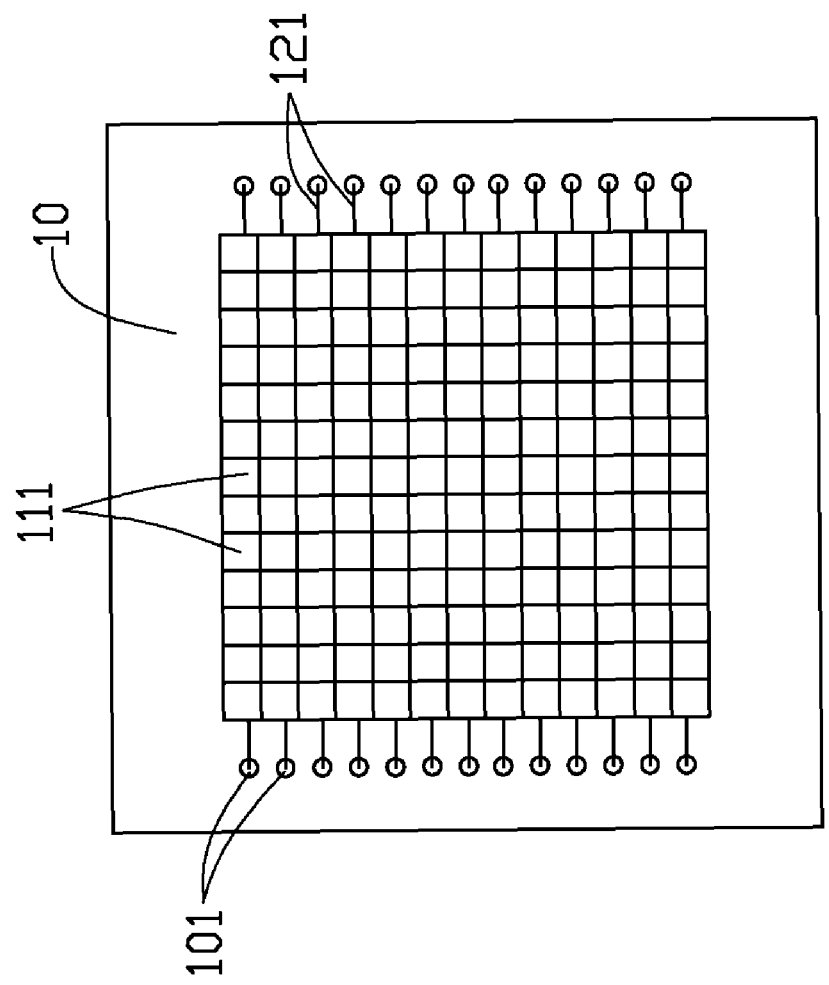
FIG. 4 is a schematic view of a conventional digital micro-mirror device.

Referring to FIG. 3, a projection optical system 200 according to a second embodiment of the present invention is shown. The projection optical system 200 includes a light source assembly 30, a color wheel 31, a condensing lens 32, a reflector 33, a DMD 34, a projecting lens 35, and a light blocker 36.

A difference between the projection optical system 100 and the projection optical system 200 is that the light blocker 36 includes a first frame portion 361 and a second frame portion 362. The first, second frame portions 361, 362 are L-shaped plates and disposed discretely along the light path of the DMD 34 to block light reflected by the bonding wires 348 of the DMD 34. The first frame portion 361 is disposed between the DMD 34 and the projecting lens 35, and the second frame portion 362 is disposed along the light path of light output form the projecting lens 35, or vice versa.

Alternatively, one of the first, second frame portions 361, 362 or both of the first, second frame portions 361, 362 can be disposed along the light path of light input into the DMD 34 to block an incident light reaching the bonding wires 348 of the DMD 34. In assembly, firstly the first frame portion 361 is fixed to block light at one side of the DMD 34. Then, the second frame portion 362 can be adjusted to block the light at the other side of the DMD 34.

As described above, the light blockers 26, 36 can act as a filter to protect the light transmitted to the projecting lenses 25, 35 from the possible stray light produced by the DMDs 24, 34. Therefore, the projection optical system 100, 200 utilizing the light blockers 26, 36 can achieve good image quality.

It should be understood that the above-described embodiment are intended to illustrate rather than limit the invention. Variations may be made to the embodiments without departing from the spirit of the invention. Accordingly, it is appropriate that the appended claims be construed broadly and in a manner consistent with the scope of the invention.

What is claimed is:

1. A projection optical system, comprising:
   a digital micro-mirror device comprising a base having a plurality of outer pads, a micro-mirror array disposed on the base, and a plurality of bonding wires electrically connecting the outer pads with the corresponding micro-mirror array; and
   a light blocker comprising a first L-shaped portion and a second L-shaped portion, the first L-shaped portion and the second L-shaped portion disposed along the light path of the digital micro-mirror device and configured for blocking the light incident to the bonding wires and the light reflected by the bonding wires.

2. The projection optical system as claimed in claim 1, wherein the light blocker is disposed along the light path of the light output from the digital micro-mirror device to block the light reflected by the bonding wires being projected.

3. The projection optical system as claimed in claim 1, wherein the light blocker is disposed along the light path of the light input to the digital micro-mirror device to block the light incident on the bonding wires.

4. The projection optical system as claimed in claim 1, wherein the light blocker is comprised of opaque resin.

5. The projection optical system as claimed in claim 1, wherein a color of the light blocker is black.

6. The projection optical system as claimed in claim 1, wherein the first L-shaped portion and the second L-shaped portions are spaced from each other and disposed along the light path at a light emitting side of the digital micro-mirror device.

7. The projection optical system as claimed in claim 1, wherein the first and second L-shaped plates are spaced from each other and are disposed along the light path at a light incident side of the digital micro-mirror device.

8. The projection optical system as claimed in claim 1, wherein the first L-shaped plate is disposed along the light path at a light emitting side of the digital micro-mirror device and the second L-shaped plate is disposed along the light path at a light incident side of the digital micro-mirror device.

9. The projection optical system as claimed in claim 1, further comprising a projecting lens, wherein the first L-shaped plate is disposed between the digital micro-mirror device and the projecting lens, and the second L-shaped plate is disposed along the light path of light output from the projecting lens.

* * * * *